US012088866B2

(12) United States Patent
Liu

(10) Patent No.: US 12,088,866 B2
(45) Date of Patent: Sep. 10, 2024

(54) METHODS AND SYSTEMS FOR LINKING CONTENT

(71) Applicant: Comcast Cable Communications, LLC, Philadelphia, PA (US)

(72) Inventor: Jianju Liu, Kentfield, CA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 18/113,300

(22) Filed: Feb. 23, 2023

(65) Prior Publication Data
US 2024/0007693 A1 Jan. 4, 2024

Related U.S. Application Data

(63) Continuation of application No. 14/176,394, filed on Feb. 10, 2014, now abandoned.

(51) Int. Cl.
| | |
|---|---|
| *H04N 21/258* | (2011.01) |
| *H04L 69/14* | (2022.01) |
| *H04N 21/2543* | (2011.01) |
| *H04N 21/41* | (2011.01) |
| *H04N 21/43* | (2011.01) |

(52) U.S. Cl.
CPC ....... *H04N 21/25816* (2013.01); *H04L 69/14* (2013.01); *H04N 21/2543* (2013.01); *H04N 21/4122* (2013.01); *H04N 21/41265* (2020.08); *H04N 21/43079* (2020.08)

(58) Field of Classification Search
CPC ......... H04N 21/25816; H04N 21/2543; H04N 21/4122; H04N 21/41265; H04N 21/43079; H04L 69/14
See application file for complete search history.

(56) References Cited

U.S. PATENT DOCUMENTS

| | | | |
|---|---|---|---|
| 8,886,748 B1* | 11/2014 | Pattison | H04L 51/08 709/217 |
| 2003/0035383 A1 | 2/2003 | Hershey | |
| 2008/0201736 A1 | 8/2008 | Gordon et al. | |
| 2010/0182950 A1 | 7/2010 | Sexton et al. | |
| 2011/0321107 A1* | 12/2011 | Banks | H04N 21/234363 725/110 |
| 2012/0081607 A1 | 4/2012 | Kitazato | |

(Continued)

FOREIGN PATENT DOCUMENTS

KR 20090083274 A 8/2009

*Primary Examiner* — Anh Nguyen
(74) *Attorney, Agent, or Firm* — Ballard Spahr LLP

(57) ABSTRACT

Methods and systems for linking content are provided. An example method can comprise a first device receiving first content via a non-packetized network from a content provider, wherein the first content comprises one or more trigger elements. A user of the first device can select one or more trigger elements in the first content and a trigger signal can be transmitted from the first device to a linking system. The linking system can receive a request for information from a second device. The linking system can associate the request for information with the trigger signal and transmit a request for second content to the content provider, wherein the second content relates to one or more trigger elements of the first content. Upon receiving the request for second content, the content provider can transmit the second content to the second device via a packetized network.

21 Claims, 6 Drawing Sheets

(56) References Cited

U.S. PATENT DOCUMENTS

| | | |
|---|---|---|
| 2012/0096499 A1 | 4/2012 | Dasher et al. |
| 2012/0117587 A1* | 5/2012 | Pedlow ............ H04N 21/64322 |
| | | 704/E11.001 |
| 2013/0067020 A1 | 3/2013 | German et al. |
| 2014/0013379 A1 | 1/2014 | Kitazato et al. |
| 2014/0067961 A1 | 3/2014 | Archibong et al. |
| 2014/0189836 A1* | 7/2014 | Eyler .................... G06F 21/41 |
| | | 726/7 |
| 2015/0040172 A1 | 2/2015 | Zelesko et al. |
| 2015/0121432 A1* | 4/2015 | Pandey .............. H04N 21/4755 |
| | | 725/78 |

\* cited by examiner

METHODS AND SYSTEMS FOR LINKING CONTENT

CROSS-REFERENCE TO RELATED APPLICATIONS

This application claims priority under 35 U.S.C. § 120 to and is a continuation of U.S. patent application Ser. No. 14/176,394, filed Feb. 10, 2014, the entire contents of which are hereby incorporated herein by reference in its entirety for all purposes.

BACKGROUND

Packet switched network technology such as Internet Protocol (IP) offers several advantages over non-packet switched network technology such as quadrature amplitude modulation (QAM). For example, a packet switched network can serve a large number of IP-enabled devices, such as mobile devices. In addition, enhanced features can easily be added to a packet switched network. Conversely, adding enhanced features to a non-packet switched network (e.g., QAM network) can be restricted because a non-packet switched network has limited out-of-band (OOB) bandwidth. These and other shortcomings are addressed by the present disclosure.

SUMMARY

It is to be understood that both the following general description and the following detailed description are exemplary and explanatory only and are not restrictive. Methods and systems for linking content are disclosed. In an aspect, while first content is being provided to a first device via a non-packetized network (e.g., QAM network), a second device can access second content via a packetized network such as an IP network. The first content can comprise one or more trigger elements and the second content can relate to the one or more trigger elements of the first content. Activation (e.g., selection, execution, etc.) of one or more of the trigger elements can cause the second content to be provided (e.g., transmitted, rendered, presented, etc.) to the user, for example, via the packetized network. Using such trigger elements (or other mechanisms), the disclosed methods and systems can combine the non-packetized and packetized networks to enhance and complement the viewing experience of a user. As such, a device (e.g., second device) configured to communicate via a packet switched network can access certain enhanced features relating to the first content delivered via a non-packetized based device (e.g., first device).

In an aspect, a method can comprise transmitting first content via a non-packetized network to a first device. The first content can comprise one or more trigger elements. A request for second content can also be received. The second content can relate to one or more trigger elements of the first content. The request for second content can comprise information relating to a second device such as a device identifier and/or a user identifier. The second content can be transmitted via a packetized network to the second device.

In another aspect, a method can comprise receiving first content via a non-packetized network at a first device. The first content can comprise one or more trigger elements. The first device can be associated with a device identifier. In response to activation of one or more of the trigger elements, a trigger signal can be transmitted via an out-of-band (OOB) portion (e.g., OOB network, channel, frequency) of the non-packetized network. The trigger signal can comprise the device identifier associated with the first device and information relating to one or more trigger elements. The trigger signal can facilitate the transmission of second content to a second device via a packetized network. As an example, the second content can relate to the one or more trigger elements of the first content.

In a further aspect, a method can comprise receiving a trigger signal comprising a device identifier associated with a first device and information relating to one or more trigger elements of first content provided via the first device. A request for information can be received from a second device. The request for information can be associated with the trigger signal. A request for second content can be transmitted based upon the trigger signal and the request for information. The second content can be transmitted to the second device via a packetized network. The second content can relate to one or more trigger elements of the first content.

Additional advantages will be set forth in part in the description that follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
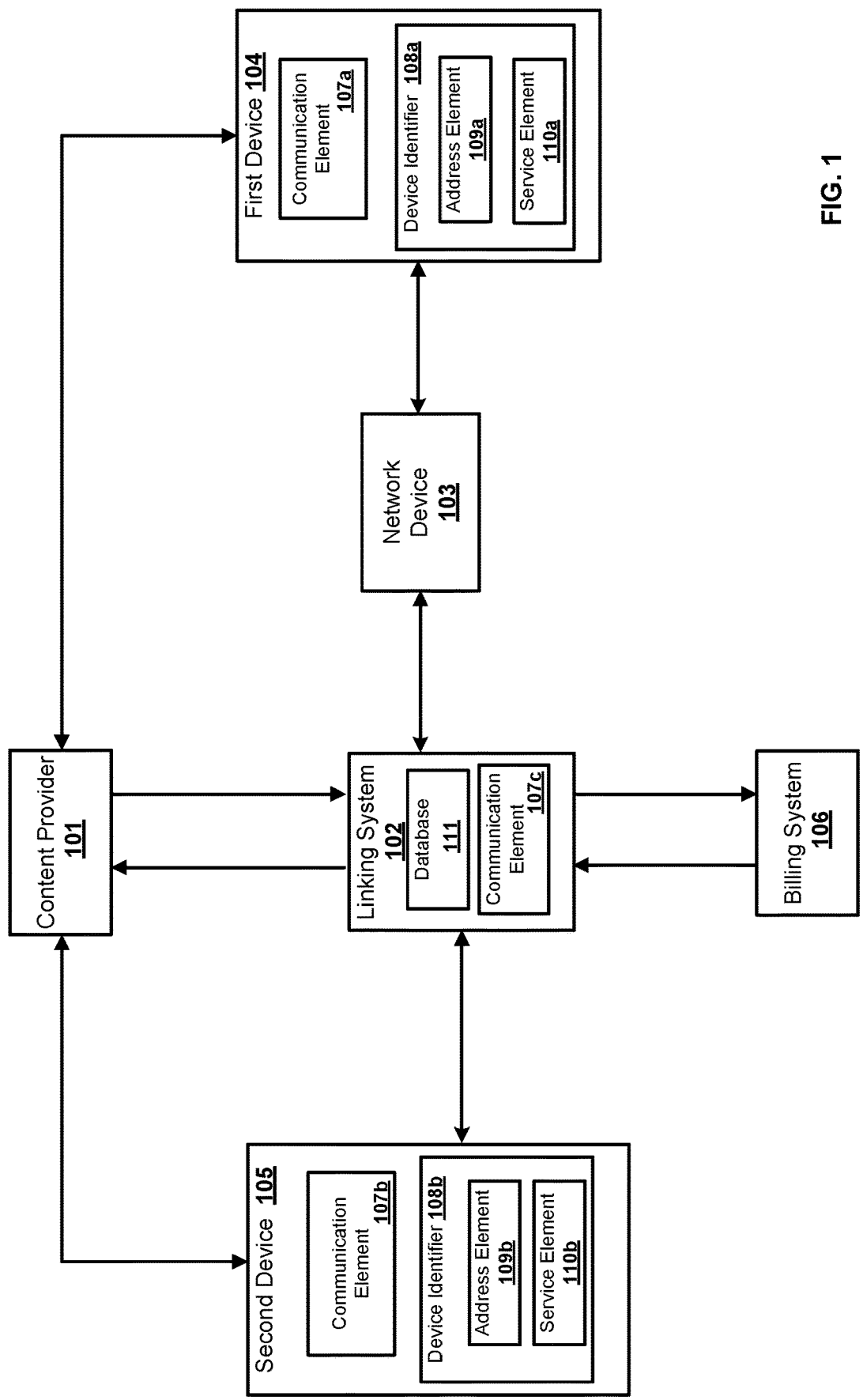
FIG. 1 illustrates various aspects of an exemplary system in which the present methods and systems can operate.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for linking content. Specifically, while first content is being provided to a first device via a non-packetized (e.g., QAM network), a second device can access second content via a packetized network (e.g., IP network). The first content can comprise playable content, and the second content can comprise one or more enhanced features relating to the first content. In an aspect, the first device may not be able to access the second content because the non-packetized network may have limited out-of-band (OOB) bandwidth. As such, the second device can be used to access the enhanced feature relating to the first content. As an example, one or more enhanced features can comprise a knowledge base of a character such as a plot summary associated with the character, quotes of the character, name and/or biography of actor/actress who plays the character. Enhanced features can comprise advertisements, promotions, interactive purchasing opportunities, highlighting points, and/or polling points. The enhanced features can relate to a specific scene, character, and/or time instance in the first content. As another example, the one or more enhanced features can comprise information on content length, content title, content provider, content type (e.g., pay-per-view content, video on demand content), content format (e.g., digital, analog), content identifier (e.g., content id), content release date, content update frequency, content category (e.g., romance, comedy, etc.), content rating (e.g., PG, R, PG-13), the price for ordering the content, content viewing history, and the like. In an aspect, the one or more enhanced features can be stored in metadata of the first content.

In an aspect, providing the enhanced feature can be facilitated using one or more trigger elements. As an example, the first content can comprise one or more trigger elements and the second content can relate to the one or more trigger elements of the first content. Activation (e.g., selection, execution, etc.) of one or more of the trigger elements can cause the second content to be provided (e.g., transmitted, rendered, presented, etc.) to the user, for example, via the packetized network. Using such trigger elements (or other mechanisms), the disclosed methods and systems can combine the non-packetized and packetized networks to enhance and complement the viewing experience of a user. As such, a device (e.g., second device) configured to communicate via a packet switched network can access certain enhanced features relating to the first content delivered via a non-packetized based device (e.g., first device).

In an aspect, single device can receive first content via the non-packetized network and can receive enhanced features via the packetized network. Such multi-network configuration can facilitate the presentation of first content and enhanced content simultaneously on the same device. In another aspect, markers (e.g., trigger elements) can be processed in the first content to cause a list of available enhanced features to be presented via the second device. As such, a user can select one or more of the available enhanced features to facilitate the request and/or delivery of the select available enhanced feature. In a further aspect, multiple devices can be configured to receive content via one or more networks.

Figure 2:
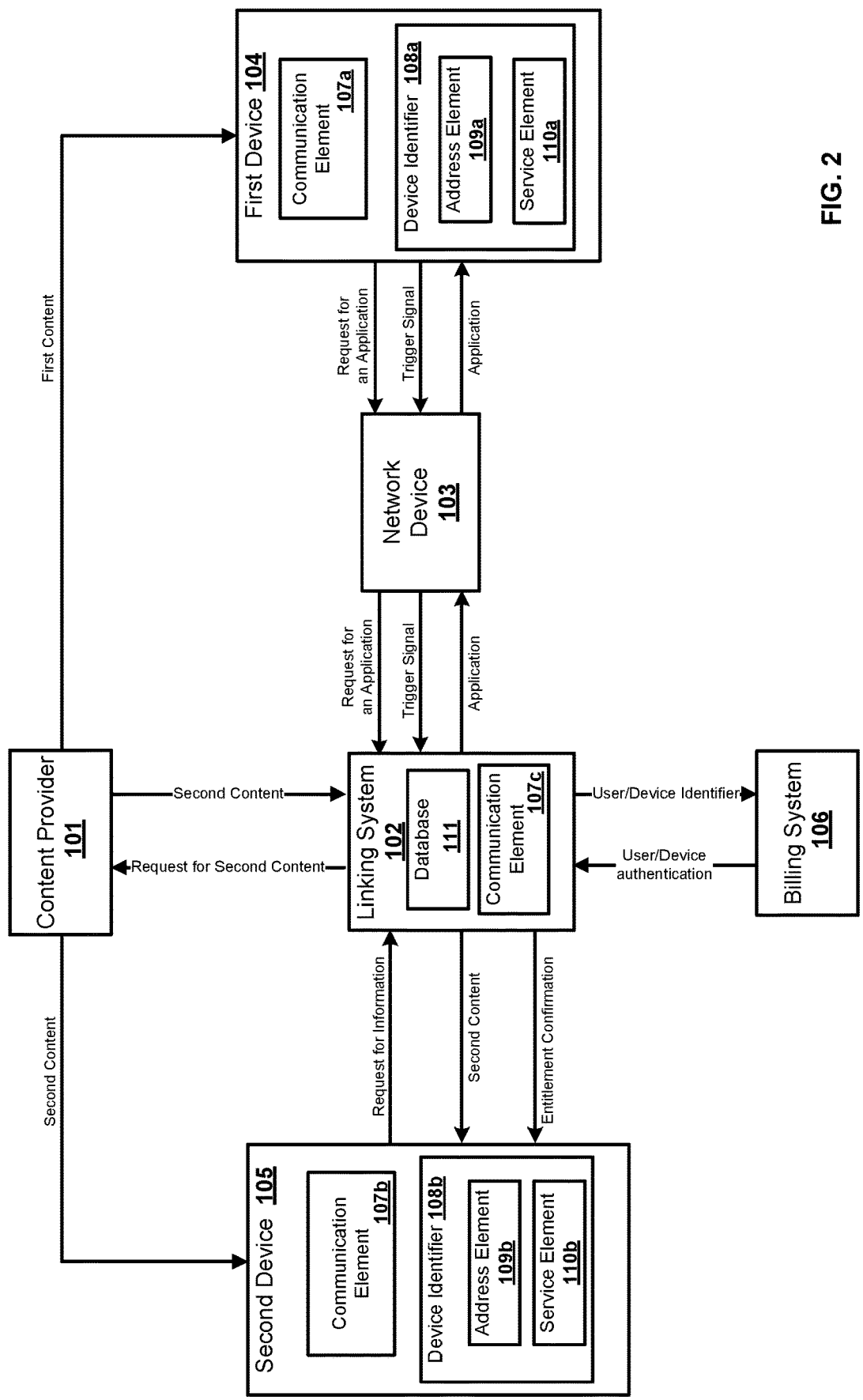
FIG. 2 illustrates various aspects of another exemplary system and data flow in which the present methods and systems can operate.

FIGS. 1-2 illustrate various aspects of an exemplary method and system in which the present methods and systems can operate. An exemplary method can be implemented using one or more of a content provider 101, a linking system 102, a network device 103, a first device 104, a second device 105, and a billing system 106.

In an aspect, the content provider 101 can provide content to the first device 104 and the second device 105. In an aspect, the content provider 101 can be configured as (or disposed at) a central location (e.g., a headend, or processing facility), which can receive content (e.g., data, input programming) from multiple sources. In an aspect, the content provider 101 can combine the content from the multiple sources and can distribute the content to user (e.g., subscriber) locations via a distribution system. There can be a multitude of user locations connected to the distribution system. The signals provided by the content provider 101 can include a single content item or a multiplex that includes several content items. For example, the signals provided by content provider 101 can comprise playable content and metadata associated with the playable content. In an aspect, the content provider 101 can carry pay-per-view and/or video on demand service. In an aspect, the content provider 101 can be configured to provide content via different types of network technologies (e.g., packetized network, non-packetized network). As an example, the content provider 101 can provide first content to the first device 104 via a non-packetized network (e.g., QAM network). As another example, the content provider 101 can provide second content to the second device 105 via a packetized network (e.g., IP network). One skilled in the art would recognize that the first device may also be capable of communicating via a packetized network and the second device may also capable of communicating via a non-packetized network.

In an aspect, the first device 104 can comprise a set-top box, television, communication terminals or the like. In an aspect, the first device 104 does not need to be in a fixed location. It can be deployed in any location convenient to communicate with the content provider 101 and/or the network device 103. In an aspect, the first device 104 can be a device or system capable of accessing a non-packetized network (e.g., QAM network), but may not be capable of accessing a packetized network (e.g., IP network). In an aspect, the first device 104 can access first content (e.g., television program, movie) via the non-packetized network, but may not be able to access second content (e.g., enhanced features associated with the first content) because the non-packetized network can have limited out-of-band (OOB) bandwidth. In an aspect, a user of the first device 104 can select one or more trigger elements associated with respective one or more enhanced features in the first content via the first device 104. As an example, the first device 104 can request an application from the linking system 102 via the network device 103. As such, the application can facilitate a user interaction with the one or more trigger elements. In an aspect, the user of the first device 104 can select one or more trigger elements associated with respective features of the first content through the application. In another aspect, the application can be software configured to retrieve and/or perform an operation based on the application trigger data associated with the one or more trigger elements embedded in the first content. As an example, performing an action can comprise transmitting a pointer (e.g., timeline indicating the current scene of the first content presented via a display). The pointer can be a trigger signal (e.g., data signal, packet, metadata) and can be received by the linking system 102. The linking system 102 can use the pointer to determine the second content to be collected and transmitted to the second device 105. Alternatively, the application trigger data can be processed in a way to allow interaction with a user. For example, a list of options can be presented via a display for user selection. As another example, input/action received from the user can be configured as a trigger signal (e.g., linkage message) and transmitted to the linking system 102 for the preparation of second content to be transmitted to the second device 105.

In an aspect, the second device 105 can comprise a set-top box, programmable consumer electronic device, smart phone, computer, tablet, mobile device, PDA, smart television, vehicle entertainment system, communications terminal, or the like. In an aspect, the second device 105 does not need to be in a fixed location. The second device 105 can be deployed in any location convenient for communication with the content provider 101 and/or linking system 102. In an aspect, a second device 105 can be a device or system that is capable of accessing a packetized network channel (e.g., IP network). In an aspect, the second device 105 can be used to access the enhanced features relating to the first content, wherein the first content is being provided to the first device 104. As an example, one or more enhanced features can comprise a knowledge base of a character such as a plot summary associated with the character, quotes of the character, name and/or biography of actor/actress who plays the character. Enhanced features can comprise advertisements, promotions, interactive purchasing opportunities, highlighting points, and/or polling points. The enhanced features can relate to a specific scene, character, and/or time instance in the first content. As another example, the one or more enhanced features can comprise information on content length, content title, content provider, content type (e.g., pay-per-view content, video on demand content), content format (e.g., digital, analog), content identifier (e.g., content id), content release date, content update frequency, content category (e.g., romance, comedy, etc.), content rating (e.g., PG, R, PG-13), the price for ordering the content, content viewing history, and the like. In an aspect, the one or more enhanced features can be stored in metadata of the first content. The second device 105 can facilitate the viewer of the first content accessing the enhanced features of the first content. Therefore, the first device 104 and the second device 105 can combine the first content delivered via the non-packetized network and the second content delivered via the packetized network to enhance and complement the viewing experience.

In an aspect, the linking system 102 can comprise a server capable of linking content being provided to the first device 104 and the second device 105. As an example, the linking system 102 can be a personal computer, portable computer, server, router, network computer, peer device, common network node, and the like. The linking system 102 can comprise hardware and/or software components. In an aspect, the linking system 102 can receive a request for an application capable of consuming the trigger elements in the first content from the first device 104. The linking system 102 can transmit the requested application to the first device 104. In an aspect, the linking system 102 can be configured to provide second content (e.g., the enhanced features associated with the first content) to the second device 105 while the first content is being provided to the first device 104. For example, the linking system 102 can receive a request for information or application from the second device 105 and receive a trigger signal from the first device 104. The linking system 102 can associate the request for information and the trigger signal. For example, the linking system 102 can determine whether a portion of the request for information (e.g., a user identifier associated with the first device 104) matches a portion of the trigger element (e.g., a user identifier associated with the second device 105). Based upon the trigger signal and the request for information, a request for second content (e.g., enhanced features associated with the first content) can be transmitted from the linking system 102 to the content provider 101. In turn, the linking system 102 can receive second content from the content provider 101 and transmit the second content to the second device 105.

In an aspect, the linking system 102 can transmit a portion of the trigger to the billing system 106 to authenticate a user of the first device 104. In an aspect, the linking system 102 can transmit all or a portion of the request for information to the billing system 106 to authenticate a user of the second device 105 to determine whether the user associated with the second device 105 is the same user associated with the first device 104. For example, the linking system 102 can transmit a user identifier (e.g., user account information or login credentials as a customer or subscriber of a content provider 101) and/or device identifier associated with the first device 104 to the billing system 106. The billing system 106 can be configured to determine whether the user of the first device is entitled to access the second content. As another example, the linking system 102 can transmit a user identifier (e.g., user account information or login credentials as a customer or subscriber of a content provider 101) and/or device identifier associated with the second device 105 to the billing system 106. The linking system 102 can thereby determine whether the user associated with the second device 105 is the same user associated with the first device 104. Upon successful authentication, an entitlement confirmation can be transmitted from the linking system 102 to the second device 105. As an example, the entitlement confirmation can be in the form of a code, a piece of text, a protocol message, and the like. As an example, the billing system 106 can be a personal computer, portable computer, server, router, network computer, peer device, other common network node, and the like configured to communicate with the linking system 102. In an aspect, the billing system 106 and the linking system 102 can be implemented as separate network entities or reside in a common location.

In an aspect, the network device 103 can be used to connect the first device 104 and the linking system 102. As an example, the network device 103 can be a personal computer, portable computer, server, router, network computer, peer device, other common network node, and the like configured to communicate with the first device 104 and the linking system 102. In an aspect, the network device 103 can relay a request from the first device 104 for an application to the linking system 102. In an aspect, the network device 103 can receive the requested application from the linking system 102 and transmit the requested application to the first device 104. In an aspect, the application can be used to consume trigger elements in the first content. For example, the application can intercept and execute the trigger elements in the first content. The application can be an Enhanced TV Binary Interchange Format (EBIF) application. Once one or more trigger elements have been selected via the first device 104, a trigger signal can be transmitted from the first device 104 to the network device 103 and the network device 103 can relay the trigger to the linking system 102. In an aspect, the trigger signal can comprise a user identifier (e.g., user account information or login credentials as a customer or subscriber of a content provider), a device identifier associated with the first device 104, and/or information relating to one or more trigger elements in the first content.

In an aspect, the first device 104 can comprise a communication element 107a. The communication element 107a can comprise software, hardware, and/or interfaces for presenting and/or receiving information to/from a user. For example, a user of the first device 104 can request an application (e.g., an EBIF application) via the communication element 107a. As another example, the user of the first device 104 can select one or more trigger elements in the first content via the communication element 107a. In another aspect, the communication element 107a can request and/or transmit data from/to a local source and/or a remote source. As an example, the communication element 107a can transmit and/or receive data to/from the network device 103. Specifically, the communication element 107a can transmit a request for an application and trigger signal to the network device 103. In an aspect, the communication element 107a can be configured to utilize a wired and/or wireless network using Wi-Fi, Bluetooth, MoCa, DLNA, Ethernet or any desired method or standard.

In an aspect, the second device 105 can have a communication element 107b. The communication element 107b can comprise software, hardware, and/or interfaces for presenting and/or receiving information to/from a user. For example, a user of the second device 105 can present a request for information via the communication element 107b. As another example, the communication element 107b can request or transmit data from/to a local source and/or a remote source. Specifically, the communication element 107b can transmit a request for information to the linking system 102 to identify the second device 105. As another example, the communication element 107b can transmit an action/feedback from the user of the second device 105 or transmit a state of the second device 105 to the linking system 102. In an aspect, the communication element 107b can be configured to utilize a wired and/or wireless network using Wi-Fi, Bluetooth, MoCa, DLNA, Ethernet or any desired method or standard. In an aspect, the communication element 107a can be configured to use different hardware, software and/or interface. For example, the communication element 107a can be configured to utilize a packetized network compatible communication protocol, whereas the communication element 107b can be configured to utilize a non-packetized network compatible communication protocol.

In an aspect, the first device 104 can be associated with a user identifier or device identifier 108a. As an example, the device identifier 108a can be any identifier, token, character, string, or the like, for differentiating one user or device from another user or device. In a further aspect, the device identifier 108a can identify a user or user device as belonging to a particular class of users or user devices. As a further example, the device identifier 108a can comprise information relating to the user device, such as a manufacturer, a model or type of device, a service provider associated with the first device 104, a state of the first device 104, a locator, and/or a label or classifier. Other information can be represented by the device identifier 108a. As an example, the user identifier or device identifier 108a can be part of the trigger signal. As another example, a content provider (e.g., content provider 101) can provide first content to first device 104 according to its user identifier or device identifier 108a. As another example, the user identifier or device identifier 108a can be used by a billing system (e.g., billing system 106) to authenticate a user or user device (e.g., first device 104).

In an aspect, the device identifier 108a can comprise an address element 109a and/or a service element 110a. In an aspect, the address element 109a can comprise or provide an internet protocol address, a network address, a media access control (MAC) address, an Internet address, or the like. As an example, the address element 109a can be relied upon to establish a communication session between the first device 104 and other network devices or systems, such as the content provider 101, the linking system 102, and/or the network device 103. As a further example, the address element 109a can be used as an identifier or locator of the first device 104. In an aspect, the address element 109a can be persistent for a particular network. As an example, address element 109a can be part of the request for an application and trigger signal. As another example, a content provider (e.g., content provider 101) can provide first content to the first device 104 at its location according to its address element 109a. As another example, address element 109a can be used by a billing system (e.g., billing system 106) to authenticate a user or user device (e.g., first device 104).

In an aspect, the service element 110a can comprise an identification of a service provider associated with the respective device and/or with the class of device. The class of the device can be related to a type of device, capability of device, type of service being provided, and/or a level of service (e.g., business class, service tier, service package, etc.). As an example, the service element 110a can comprise information relating to or provided by a content service provider (e.g., content provider 101) that is providing or enabling data flow such as communication services to the respective device. As a further example, the service element 110a can comprise information relating to a preferred service provider for one or more particular services relating to the first device 104. In an aspect, the address element 109a can be used to identify or retrieve data from the service element 110a, or vice versa. As an example, service element 110a can comprise information of a content provider for a specific user or device. As another example, service element 110a can comprise information of pay-per-view service or video on-demand service that a specific user or device is entitled to access. In an aspect, the second device 105 can be associated with a user identifier or device identifier 108b. As an example, the device identifier 108b can be any identifier, token, character, string, or the like, for differentiating one user or device from another user or device. In a further aspect, the device identifier 108b can identify a user or user device as belonging to a particular class of users or user devices. As a further example, the device identifier 108b can comprise information relating to the user device, such as a manufacturer, a model or type of device, a service provider associated with the second device 105, a state of the second device 105, a locator, and/or a label or classifier. Other information can be represented by the device identifier 108b. As an example, the user identifier or device identifier 108b can be part of the request for information and request for second content. As another example, the user identifier or device identifier 108b can be used by a billing system to authenticate a user or user device. As another example, a content provider (e.g., content provider 101) can provide second content to the second device 105 according to its user identifier or device identifier 108b.

In an aspect, the device identifier 108b can comprise an address element 109b and/or a service element 110b. In an aspect, the address element 109b can comprise or provide an internet protocol address, a network address, a media access control (MAC) address, an Internet address, or the like. As an example, the address element 109b can be relied upon to establish a communication session between the second device 105 and other network devices or systems, such as the content provider 101, or the linking system 102. For example, the content provider 101 can provide second content to the second device 105 at its location according to its address element 109b. As a further example, the address element 109b can be used as an identifier or locator of the second device 105. In an aspect, the address element 109b can be persistent for a particular network. As an example, the address element 109b can be part of the request for information and/or request for second content. As another example, the address element 109b can be used by a billing system (e.g., billing system 106) to authenticate a user or user device (e.g., second device 105).

In an aspect, the service element 110b can comprise an identification of a service provider associated with the respective device and/or with the class of device. The class of the device can be related to a type of device, capability of device, type of service being provided, and/or a level of service (e.g., business class, service tier, service package, etc.). As an example, the service element 110b can comprise information relating to or provided by a content service provider (e.g., content provider 101) that is providing or enabling data flow such as communication services to the respective device. As a further example, the service element 110b can comprise information relating to a preferred service provider for one or more particular services relating to the respective device. In an aspect, the address element 109b can be used to identify or retrieve data from the service element 110b, or vice versa. As an example, the service element 110a can comprise information of content provider for a specific user or device (e.g. second device 105). As another example, the service element 110b can comprise information regarding pay-per-view service or video on-demand service that a specific user or device is entitled to access.

In an aspect, a database 111 can be configured for storing a plurality of files (e.g., web pages), user identifiers, device identifiers, records, or other information. For example, the database 111 can store information relating to the first device 104 and the second device 105, such as the device identifiers 108a,b, address elements 109a,b and/or the service elements 110a,b. Specifically, the linking system 102 can obtain the device identifier 108a of a first device 104 and retrieve information from the database 111 such as the address element 109a and/or the service elements 110a of the first device 104. As another example, the linking system 102 can obtain the device identifier 108b of a second device 105 and retrieve information from the database 111 such as the address element 109b and/or the service elements 110b of the second device 105. As a further example, the linking system 102 can obtain the address element 109a from a first device 104 and can retrieve the service element 110a of the first device from the database 111, or vice versa. Any information can be stored in and retrieved from the database 111. In an aspect, the database 111 can be disposed remotely from the linking system 102 and accessed via direct or indirect connection. In another aspect, the database 111 can be integrated with the linking system 102 or some other device or system.

In an aspect, the linking system 102 can have a communication element 107c. The communication element 107c can comprise software, hardware, and/or interfaces for transmitting and/or receiving information to/from the first device 104, the second device 105, the network device 103, and the billing system 102. For example, the communication element 107c can receive a request an application (e.g., an EBIF application) from the first device 104. As another example, the communication element 107c can transmit the requested application to the first device 104 via the network device 103. As another example, the communication element 107c can receive a request for information from the communication element 107b of the second device 105. As another example, the communication element 107c can receive an action/feedback from the user of the second device 105 or operating state of the second device 105. As another example, the communication element 107c can transmit a message to the first device 104 to indicate that a second device 105 cannot be found. In an aspect, the communication element 107c can be configured to utilize a wired and/or wireless network using Wi-Fi, Bluetooth, MoCa, DLNA, Ethernet or any desired method or standard.

In an aspect, the network connection between the content provider 101 and the second device 105 can comprise a packet switched network (e.g., internet protocol based network). The network connection between the second device 105 and the linking system 102 can comprise a packet switched network (e.g., internet protocol based network). The network connection between the content provider 101 and the first device 104 can comprise a non-packet switched network (e.g., QAM network). The network connection between the first device 104 and the network device 103 can comprise an out-of-band (OOB) portion (e.g., OOB network, channel, frequency) in a non-packet switched network (e.g., QAM network). The network between the network device 103 and the linking system 102 can comprise a packet switched network (e.g., IP network). For example, the first device 104 can transmit a trigger signal to the network device 103 via an OOB portion (e.g., OOB network, channel, frequency) in a QAM channel. The network device 103 can transmit the trigger signal to the linking system 102 via an IP network. In an aspect, the OOB portion (e.g., OOB network, channel, frequency) can comprise an ALOHA network or a digital audio visual council (DAVIC) network. By way of example, the information contained in the trigger signal can be carried in one asynchronous transfer mode (ATM) cell of ALOHA network or two ATM cells of DAVIC network. In an aspect, the network connection can comprise network adapters, switches, routers, and the like connected through wireless links (e.g., radio frequency, satellite) and/or physical links (e.g., fiber optic cable, coaxial cable, Ethernet cable).

In an aspect, the communication between the devices and systems in FIG. 1 can be implemented to operate over hypertext transfer protocol (HTTP), Transmission Control Protocol (TCP), Internet Protocol (IP), File Transfer Protocol (FTP), Telnet, Hypertext Transfer Protocol Secure (HTTPS), Session Initiation Protocol (SIP), Simple Object Access Protocol (SOAP), Extensible Mark-up Language (XML) and variations thereof, Simple Mail Transfer Protocol (SMTP), Real-Time Transport Protocol (RTP), Remote Desktop Protocol (RDP), Advanced Remote Desktop Protocol (ARDP), User Datagram Protocol (UDP), Global System for Mobile Communications (GSM) technologies, Code Division Multiple Access (CDMA) technologies, Evolution Data Optimized Protocol (EVDO), Internet Group Management Protocol (IGMP), Real Time Streaming Protocol (RTSP), Time Division Multiple Access (TDMA) technologies, radio frequency (RF) signaling technologies, wireless communication technologies (e.g., Bluetooth, Wi-Fi, etc.) and other suitable communications technologies.

FIG. 2 illustrates various aspects of an exemplary data flow. In an aspect, the first device 104 can receive first content from the content provider 101 via a non-packetized network (e.g., QAM network). The first content can comprise one or more trigger elements. As an example, the first content can be a television show or movie, a video clip, an advertisement, an electronic game, and the like. One or more trigger elements can be markers linked to enhanced features of the first content. In an aspect, markers can be in the form of patterns of dots or squares, codes, graphics, numbers, letters, and the like, inserted at specific scene or time instance in the first content. An application running on the first device 104 can process the markers and/or cause some operation to be performed based on the markers. For example, as a result of marker consumption or execution, a pointer (e.g., timeline indicating current scene of the first content playing at the first device 104) can be wrapped in a trigger signal. As an example, one or more enhanced features can comprise a knowledge base of a character such as a plot summary associated with the character, quotes of the character, biography information of actor/actress who plays the character. Enhanced features can comprise advertisements, promotions, interactive purchasing opportunities, highlighting points, and/or polling points. The enhanced features can relate to a specific scene, character, and/or time instance in the first content. As another example, the one or more enhanced features can comprise information on content length, content title, content provider, content type (e.g., pay-per-view content, video on demand content), content format (e.g., digital, analog), content identifier (e.g., content id), content release date, content update frequency, content category (e.g., romance, comedy, etc.), content rating (e.g., PG, R, PG-13), the price for ordering the content, content viewing history, and the like. In an aspect, the enhanced features can be deployed at the content provider 101. In another aspect, the enhanced features can be deployed at the Linking System 102.

In an aspect, the first device 104 can request an application from the linking system 102. Upon the request from the first device 104, the linking system 102 can transmit the application to the first device 104. When the application is running at the first device 104, the application can consume and execute trigger elements embedded in the first content. In an aspect, the execution of trigger elements can send a pointer (e.g. timeline indicating current scene of the first content playing at the first device 104) as a trigger signal to the linking system 102, so that the linking system 102 can be informed of the second content to be requested, and deliver the second content to the second device 105.

In another aspect, the user of the first device 104 can select (e.g., consume, execute) trigger elements. For example, the user of the first device 104 can select from a list of items displayed at the first device 104. An input or action from user of the first device 104 can be wrapped in a trigger signal and transmitted to the linking system 102 for the preparation of second content to be delivered to the second device 105. Upon the selection of the trigger elements embedded in the first content, a trigger signal can be transmitted from the first device 104 to the network device 103. The trigger signal can be further relayed from the network device 103 to the linking system 102 via a packetized network (e.g., IP network). As an example, the trigger signal can be transmitted by a remote desktop protocol (RDP) or advanced remote desktop protocol (ARDP). In an aspect, the trigger signal can comprise a device identifier associated with the first device 104 (e.g., device identifier 108a), a linkage message, and one or more indices associated with one or more trigger elements in the first content. As an example, the identifier of the first device 104 can comprise the network address (e.g., MAC address) of the first device 104. The linkage message can be a code (e.g., one byte code 0xAA) as an indication for the linking system 102 to associate a request for information from the second device 105 with the trigger signal from the first device 104. For example, the linkage message can be an indication for the linking system 102 to look for a user identifier in the request for information that matches the user identifier in the trigger signal. As another example, the indices associated with one or more trigger elements in the first content can comprise indices of a knowledge base of specific characters or performers in the first content, advertisements, promotions, purchasing opportunities, interest points, highlighting points, polling points, or coupons related to a specific scene, character, or time instance in the first content. As another example, the indices associated with one or more trigger elements in the first content can comprise indices of information on content length, content title, content provider, content type (e.g. pay per view content, video on demand content), content format (e.g., digital, analog), content identifier (e.g., content id), content release date, content update frequency, content category (e.g. romance, comedy, etc.), content rating (e.g. PG, R, PG-13), the price for ordering the first content, content viewing history, and the like.

In an aspect, the linking system 102 can receive a request for information from a second device 105. As an example, the request for information can be initiated by a user logging into a customer or subscriber account of the content provider 101 via the second device 105. The request for information can be made by input on the keypad or voice command through the communication element 107b of the second device 105. As an example, the request for information can comprise a user identifier (e.g., user account information or login credentials as a customer or subscriber of the content provider 101) and/or device identifier associated with the second device 105 (e.g., device identifier 108b, address element 109b).

Upon receiving the request for information from a second device 105, the linking system 102 can associate the request for information from the second device 105 with the trigger signal from the first device 104. For example, the linking system 102 can determine if the user identifier in the request for information matches the user identifier in the trigger signal. As another example, the linking system 102 can determine if the user and/or device identifier in the request for information and the user and/or device identifier in the trigger signal are associated with a same user. When the user and/or device identifier in the request for information matches the identifier in the trigger signal, the request for information and the trigger signal can be associated.

In an aspect, the linking system 102 can authenticate the user of the first device 104 and/or the first device 104 by transmitting a portion of the trigger signal (e.g., user identifier, device identifier of the first device 104) to the billing system 106. The billing system 106 can determine whether a user identifier (e.g., user account information as a subscriber or customer of a content provider 101) or device identifier of the first device 104 (e.g., device identifier 108a) is entitled to access the second content. In an aspect, the linking system 102 can authenticate the user of the second device 105 and/or the second device 105 by transmitting all or a portion of the request for information (e.g., user identifier, device identifier of the second device 105) to the billing system 106. The linking system 102 can determine if the device identifier in the request for information and the device identifier in the trigger signal are associated with the same user.

In an aspect, the linking system 102 can transmit a request for second content to the content provider 101. As an example, the request for second content can comprise indices associated with one or more trigger elements in the first content. In addition, the request for second content can comprise a user identifier and/or device identifier of the second device 105. In an aspect, the linking system 102 can transmit a request for second content to the content provider 101 and receive the second content from content provider 101. In turn, the linking system 102 can transmit the second content to the second device 105 according to the user identifier and/or device identifier (e.g., device identifier 108b). The second content can be transmitted from the content provider 101 to the second device 105 directly or via the linking system 102. When the second content is deployed in the linking system 102, the second content can be transmitted from the linking system 102 to the second device 105.

As an illustrative example, a multi-screen user can elect to receive first content via a first device (e.g., first device 104) such as a digital communication terminal or digital cable terminal (DCT) set-top box (STB). For example, the multi-screen user can tune to a particular content channel to access the first content. In an aspect, the first content can comprise one or more embedded trigger elements. In another aspect, the DCT STB can make a request for an application from a linking system (e.g., linking system 102), such as a link application server, and the requested application can be received at the DCT STB. The multi-screen user can register a second device by launching a second-screen application (e.g., tablet link application) and providing customer or subscriber account information via the second device. As a result, a request for information can be transmitted from the second device to the linking system. The request for information can comprise a user identifier and/or a device identifier associated with the second device. In an aspect, registration of the second device with a particular user, account, and/or identifier can be maintained on and/or by the linking system.

The multi-screen user can select one or more trigger elements in the first content via the requested application on the DCT STB. The selection can cause the DCT STB to send a trigger signal (e.g., application request) to the linking system, for example, via a network device such as a network controller. For example, in a DAVIC network, the linking system can listen to a designated port to receive triggering signals. Specifically, a user agent running at the DCT STB can have a hostname associated with the linking system configured as the destination of triggering signals. As an example, the trigger signal can comprise an application ID, MAC address of DCT STB, and/or other data (e.g., information relating to one or more trigger elements in the first content, a linkage message such as "link app," and the like). The linking system can receive the trigger signal with the linkage message of "link app" and can search for a user identifier from the second device (e.g., IP-enabled device) that matches the user and/or device identifier (e.g., MAC address of DCT STB) in the trigger signal. In an aspect, a plurality of sub-application servers running on the linking system can handle particular content or a type of content. For example, when the linking system detects a particular code in the trigger signal, it can associate the particular code with particular content or a type of content. A respective sub-application server can be identified to handle the trigger signals with a particular code. In an aspect, the linking system can communicate with a billing server based on information in the trigger signal and can request information to determine whether the multi-screen user associated with the DCT STB is the same as the multi-screen user associated with second device. In an aspect, the linking system can transmit an entitlement confirmation to the second device to confirm that the second device is entitled to access the second content. The confirmation message can be maintained on the second device. In an aspect, the linking system can send a message to the DCT STB to indicate that a second device is not found. In turn, the application running on the DCT STB can stop execution of the trigger elements and can stop transmitting the trigger signal to the linking system.

The registered second device can be used to receive the second content from a content provider directly or via the linking system. If the second content is deployed via the linking system, the registered second device can receive the second content from the linking system. In an aspect, receiving the second content can be on based on an independent timing mechanism relating to the transmitting device and/or the receiving device. In another aspect, a synchronizing mechanism can be used to synchronize between the delivery of the first content and the second content.

In an aspect, one or more content providers can provide trigger elements that relate to one or more of the first and second content. As an example, a user watching sports via the DCT STB can be presented with a trigger element associated with a particular player in the sports programming. Upon activation of the trigger element, second content relating to the player in the sports programming of the first content can be displayed via the second device. As a further example, the content provided can configure any number of trigger elements to cause various second content items to be presented via the second device.

Figure 3:
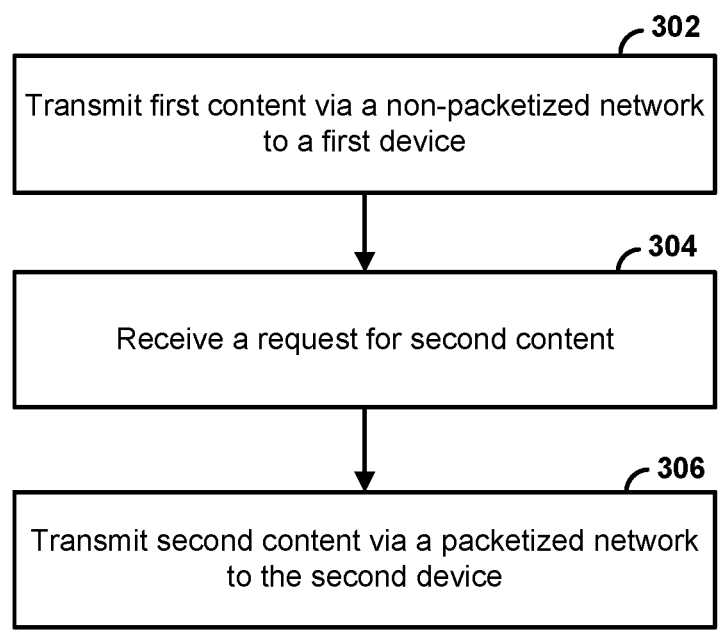
FIG. 3 is a flowchart illustrating an example method for linking content.

FIG. 3 is flowchart illustrating an example method for linking content. At step 302, first content can be transmitted to a first device via a non-packetized network. As an example, first content can be transmitted from the content provider 101 to the first device 104 via a non-packetized network. The first content can be a television show, a movie, a video clip, an advertisement, an electronic game, and the like. In an aspect, the first device 104 can be a device or system capable of accessing a non-packetized network, but may not be capable of accessing the enhanced features associated with the first content because the non-packetized network may have limited out-of-band (OOB) bandwidth. As an example, the first device 104 can comprise a set-top box, television, communication terminals or the like. In an aspect, the non-packetized network can be a QAM network. In an aspect, the first content can comprise one or more trigger elements. For example, one or more trigger elements can comprise markers linked to enhanced features associated with the first content. In an aspect, markers can be in the form of patterns of dots or squares, codes, graphics, numbers, letters, and the like inserted at a specific scene or time instance in the first content. In an aspect, the enhanced features can comprise a knowledge base of specific characters or performers in the first content, advertisements, promotions, purchasing opportunities, interest points, highlighting points, polling points or coupons related to a specific scene, character or time instance in the first content. As another example, the enhanced features can comprise information on content length, content title, content provider, content type (e.g. pay-per-view content, video on demand content), content format (e.g., digital, analog), content identifier (e.g., content id), content release date, content update frequency, content category (e.g. romance, comedy, etc.), content rating (e.g. PG, R, PG-13), the price for ordering the first content, content viewing history, and the like.

At step 304, a request for second content can be received. As an example, the content provider 101 can receive the request for second content from the linking system 102. As an example, a user of the first device 104 can select one or more trigger elements in the first content and a trigger signal can be transmitted from the first device 104 to the linking system 102. Upon receiving the trigger signal, the linking system 102 can associate a request for information from a second device 105 with the trigger signal. Based upon the trigger signal from the first device 104 and the request for information from the second device 105, the linking system 102 can transmit a request for second content to the content provider 101. In an aspect, the request for second content can comprise information relating to one or more trigger elements (e.g., indices associated with one or more trigger elements of the first content) and the user and/or device identifier associated with the second device 105. In an aspect, the second content can be deployed in the linking system 102, in this case, the linking system 102 does not need to transmit the request for second content to the content provider 101.

At step 306, second content can be transmitted to the second device via a packetized network. In an aspect, the second content can be transmitted from the content provider 101 to the second device 105 directly or via the linking system 102. In another aspect, the second content can be transmitted from the linking system 102 to the second device 105. In an aspect, the second content can comprise enhanced features associated with the first content. As an example, the enhanced features can comprise a knowledge base of specific characters or performers in the first content, advertisements, promotions, purchasing opportunities, interest points, highlighting points, polling points, or coupons related to a specific scene, character, or time instance in the first content. As another example, the enhanced features can comprise information on content length, content title, content provider, content type (e.g. pay-per-view content, video on demand content), content format (e.g., digital, analog), content identifier (e.g., content id), content release date, content update frequency, content category (e.g. romance, comedy, etc.), content rating (e.g. PG, R, PG-13), the price for ordering the first content, content viewing history, and the like. In an aspect, a second device 105 can be a device or system that is capable of accessing a packetized network (e.g., IP network). The second device 105 can be used to access the enhanced features relating to the first content, because the first device 104 may not able to access the enhanced features. As an example, the second device 105 can comprise a set-top box, programmable consumer electronic, smart phone, computer, tablet, mobile device, PDA, smart TV set, vehicle entertainment system, communications terminal or the like.

Figure 4:
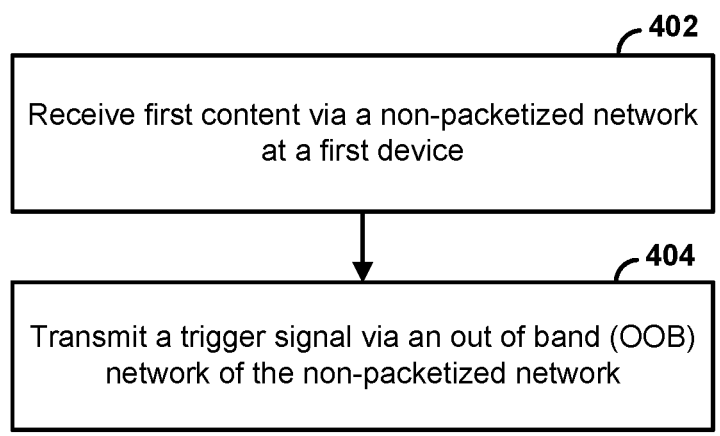
FIG. 4 is a flowchart illustrating another example method for linking content.

FIG. 4 is a flowchart illustrating another example method for linking content. At step 402, first content can be received via a non-packetized network at a first device. As an example, first content can be transmitted from the content provider 101 to the first device 104 via a non-packetized network. Specifically, the non-packetized network can be a QAM network. As an example, the first content can be a television show, a movie, a video clip, an advertisement, an electronic game, and the like. In an aspect, the first content can comprise one or more trigger elements. For example, one or more trigger elements can comprise markers linked to the enhanced features associated with the first content. In an aspect, markers can be in the form of patterns of dots or squares, codes, graphics, numbers, letters, and the like, inserted at specific scene or time instance in the first content. In an aspect, the enhanced features can comprise a knowledge base of specific characters or performers in the first content, advertisements, promotions, purchasing opportunities, interest points, highlighting points, polling points, or coupons related to a specific scene, character, or time instance in the first content. As another example, the enhanced features can comprise information on content length, content title, content provider, content type (e.g. pay-per-view content, video on demand content), content format (e.g., digital, analog), content identifier (e.g., content id), content release date, content update frequency, content category (e.g. romance, comedy, etc.), content rating (e.g. PG, R, PG-13), the price for ordering the first content, content viewing history, and the like. In an aspect, the first device 104 can be a device or system capable of accessing a non-packetized network (e.g., QAM network), but may not be capable of accessing the enhanced features associated with the first content because the non-packetized network may have limited out-of-band (OOB) bandwidth. As an example, the first device 104 can comprise a set-top box, television, communication terminals or the like. The non-packetized network can be a QAM network. In an aspect, the first device 104 can be associated with a device identifier (e.g., device identifier 108a). As an example, the device identifier can be MAC address of the first device 104.

At step 404, a trigger signal can be transmitted via an out-of-band (OOB) portion (e.g., OOB network, channel, frequency) of the non-packetized network. As an example, a user of the first device 104 can select one or more trigger elements in the first content, and in turn, a trigger signal can be transmitted from the first device 104 to the linking system 102. In an aspect, the first device 104 can transmit a trigger signal to the network device 103 via an OOB portion (e.g., OOB network, channel, frequency) of the non-packetized network, and the network device 103 can further relay the trigger signal to the linking system 102 via a packetized network (e.g., IP network). As an example, the trigger signal can be transmitted by a remote desktop protocol (RDP) or advanced remote desktop protocol (ARDP). In an aspect, the trigger signal can comprise a user identifier (e.g., user account information or login credentials as a customer or subscriber of a content provider), and/or device identifier associated with the first device 104, a linkage message, and information relating to one or more trigger elements in the first content. As an example, the device identifier of the first device 104 can comprise the network address (e.g., MAC address) of the first device 104. The linkage message can be a code (e.g., one byte code 0xAA) as an indication for the linking system 102 to associate a request for information from a second device 105 with the trigger signal from the first device 104. For example, the linkage message can be an indication for the linking system 102 to look for a user identifier in the request for information that matches the user identifier in the trigger signal. As another example, information relating to one or more trigger elements in the first content can be indices associated with one or more trigger elements. For example, the indices associated with one or more trigger elements can comprise indices of a knowledge base of specific characters or performers in the first content, advertisements, promotions, purchasing opportunities, interest points, highlighting points, polling points or coupons related to a specific scene, character or time instance in the first content. As another example, the indices associated with one or more trigger elements can comprise indices of information on content length, content title, content provider, content type (e.g. pay-per-view content, video on demand content), content format (e.g., digital, analog), content identifier (e.g., content id), content release date, content update frequency, content category (e.g. romance, comedy, etc.), content rating (e.g. PG, R, PG-13), the price for ordering the first content, content viewing history, and the like.

As a specific example, the format of the trigger signal can be a linkage message identifier (4 bits), version (4 bits), MAC address (6 bytes), reserved (4 bits), signal type (4 bits), organization identifier (3 bytes), application identifier (4 bytes), major version (4 bits), minor version (4 bits) trigger signal identifier (2 bytes), payload (4 bytes), or a combination thereof. As an example, the linkage message identifier can be a fixed one byte value such as 0xAA. Version can comprise version value of a specific trigger signal format; it can start from zero. MAC address can comprise the MAC address of the first device. Reserved can indicate usage of the trigger signal. Signal type can be defined for a specific action. For example, the signal type of 0x0 can be defined as a command to automatically execute an application. The signal type of 0x1 can be defined as a command to automatically execute an application with an indexed page defined at the first byte of a payload. The signal type of 0x3 can be defined as a command to automatically execute an application with an indexed page defined at the first byte of a payload while the remaining three payload bytes can hold a value of a default variable. The signal type of 0x4 can be defined as a command to automatically preview an application with a payload of 4 bytes, and hold a value of the default variable. The signal type of 0xA can be defined as using a customized definition from the 4 payload bytes. The signal type of 0xB, 0xC, 0xD, 0xE and 0xF can be reserved modes for the protocol for transmitting the trigger signal. The reserved mode can be for verification, diagnostic, or other internal usage. Organization identifier can be an identifier assigned by the organization to which the application is associated. Application identifier can be an application identifier assigned by an organization. Major Version can be a major version number of an application; the default value can be set to zero. Minor Version can be a minor version number of an application; the default value can be set to one. Trigger identifier can be a trigger identifier associated with a specific application; the default value can be set to one. Payload can be a value or code specific to a trigger signal. For example, payload may contain an indicator of a particular trigger element in the first content. The indicator can enable the linking system 102 to associate the particular trigger element to a respective enhanced feature as the second content.

The trigger signal can utilize a portion of OOB bandwidth of a non-packetized network that does not negatively impact performance. As an example, in a specific format, the trigger signal can comprise 22 bytes. In an aspect, the trigger signal can be contained in a single ATM cell in an ALOHA network with GXP framework or the like. GXP can be a layer of information that may or may not present in the ATM cell. For example, the cell structure can be PID (1 byte) des IP(4 bytes) des Port(2 bytes) source Port (2 bytes) [GXP(12 trigger signal (22)] PAD(0) ML(1) CRC(4)=48 bytes. In another aspect, the trigger signal can be contained in two ATM cells in DAVIC (using TCP) with or without GXP. For example, the cell structure can be: [[LLC (8) [IP (20) TCP (20) GXP (12) Trigger signal (22)]] PAD(6) CRC(8)]=96 bytes=2*48 bytes.

In an aspect, the trigger signal can facilitate the transmission of second content to a second device (e.g., second device 105) via a packetized network (e.g., IP network) and the second content can relate to one or more trigger elements of the first content. For example, upon receiving the trigger signal, the linking system 102 can associate a request for information from the second device 105 and the trigger signal from the first device 104. Based upon the request for information and the trigger signal, a request for the second content can be transmitted from the linking system 102 to the content provider 101, and in turn, the content provider 101 can provide the second content to the second device 105 directly or via the linking system 102. When the second content is deployed at the linking system 102, the second content can be transmitted from the linking system to the second device 105.

Figure 5:
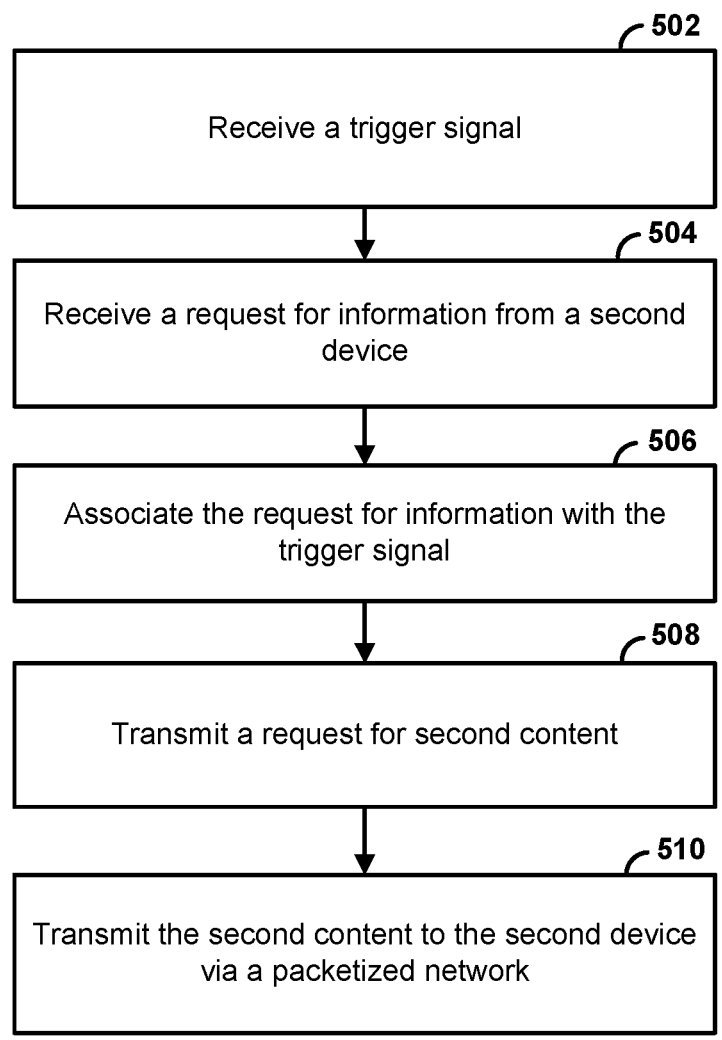
FIG. 5 is a flowchart illustrating yet another example method for linking content.

FIG. 5 is a flowchart illustrating yet another example method for linking content. At step 502, a trigger signal can be received. In an aspect, the trigger signal can be transmitted from the first device 104 to the linking system 102 via a packetized network (e.g., IP network). As an example, the trigger signal can be transmitted by a remote desktop protocol (RDP) or advanced remote desktop protocol (ARDP). In an aspect, the trigger signal can comprise a user identifier (e.g., user account information or login credentials as a customer or subscriber of a content provider), and/or device identifier associated with the first device 104, a linkage message, and information relating to one or more trigger elements in the first content. As an example, the device identifier of the first device 104 can comprise the network address (e.g., MAC address) of the first device 104. The linkage message can be a code (e.g., one byte code 0xAA) as an indication for the linking system 102 to associate a request for information from a second device 105 with the trigger signal from the first device 104. For example, the linkage message can be an indication for the linking system 102 to look for a user identifier in the request for information that matches the user identifier in the trigger signal. For example, the indices associated with one or more trigger elements can comprise indices of a knowledge base of specific characters or performers in the first content, advertisements, promotions, purchasing opportunities, interest points, highlighting points, polling points or coupons related to a specific scene, character or time instance in the first content. As another example, the indices associated with one or more trigger elements can comprise indices of information on content length, content title, content provider, content type (e.g. pay-per-view content, video on demand content), content format (e.g., digital, analog), content identifier (e.g., content id), content release date, content update frequency, content category (e.g. romance, comedy, etc.), content rating (e.g. PG, R, PG-13), the price for ordering the first content, content viewing history, and the like.

At step 504, a request for information can be received from a second device. In an aspect, the linking system 102 can receive the request for information from the second device 105. As an example, the request for information can be initiated by a user logging into a customer or subscriber account of the content provider 101 via the second device 105. As an example, the request for information can comprise a user identifier (e.g., user account information or login credentials as a customer or subscriber of the content provider 101) and/or device identifier of the second device 105 (e.g., device identifier 108b, address element 109b). In an aspect, a second device 105 can be a device or system that is capable of accessing a packetized network channel (e.g., IP network). As such, the second device 105 can be used to access the enhanced features associated with the first content, wherein the first content is being provided to the first device 104. As an example, the second device 105 can comprise a set-top box, programmable consumer electronic, smart phone, computer, tablet, mobile device, PDA, smart TV set, vehicle entertainment system, communications terminal, and the like.

At step 506, the request for information and the trigger signal can be associated. In an aspect, the linking system 102 can receive a trigger signal from the first device 104. As an example, the linking system 102 can determine whether the user identifier in the request for information matches the user identifier in the trigger signal. As another example, the linking system 102 can determine if the device identifier in the request for information and the device identifier in the trigger signal are associated with the same user. If the user and/or device identifier in the request for information matches the user and/or device identifier in the trigger signal, the request for information and the trigger signal can be associated. In an aspect, the linking system 102 can transmit all or a portion of the request for information (e.g., user identifier, device identifier of the first device 104 and second device 105) to the billing system 106 for user and/or device authentication. The linking system 102 can thereby determine whether the user associated with the second device 105 is the same user associated with the first device 104 and/or whether the first device 104 and the second device 105 are associated with the same user.

At step 508, a request for second content can be transmitted. In an aspect, based on the request for information from the second device 105 and the trigger signal from the first device 104, a request for second content can be transmitted from the linking system 102 to the content provider 101. As an example, the request for second content can comprise information relating to one or more trigger elements in the first content and the user and/or device identifier associated with the second device 105. For example, the information relating to one or more trigger elements in the first content can be indices associated with one or more trigger elements of the first content. In an aspect, the second content can be deployed in the linking system 102, in this case, the linking system 102 does not need to transmit the request for second content to the content provider 101.

Figure 6:
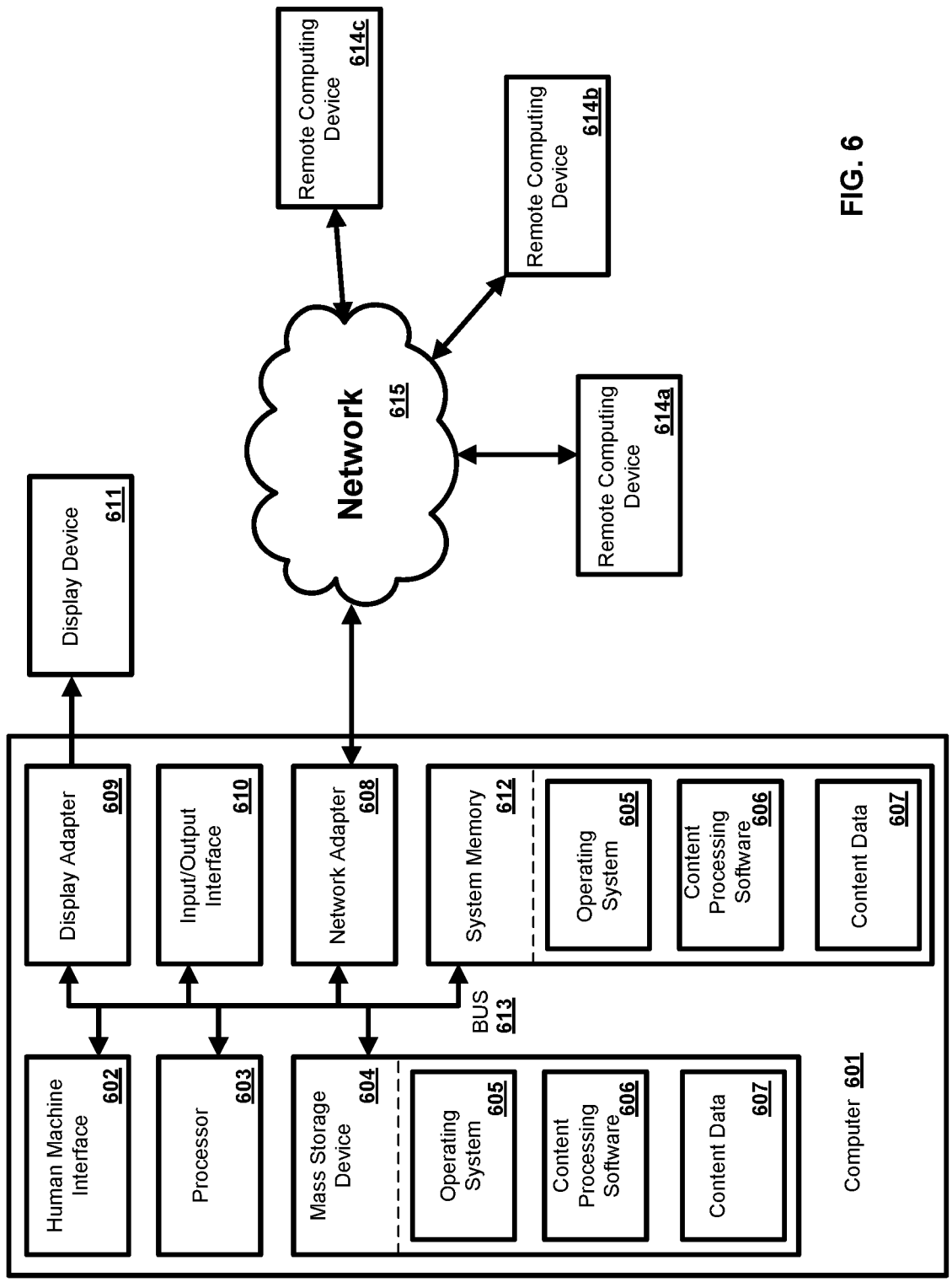
FIG. 6 is a block diagram illustrating an example computing device in which the present systems and methods can operate.

At step 510, the second content can be transmitted to the second device. In an aspect, upon receiving the request for second content, the content provider 101 can transmit the second content to the second device 105 via a packetized network (e.g., IP network). The content provider 101 can transmit the second content to the second device 105 directly or via the linking system 102. In case the second content is deployed in the linking system 102, the second content can be transmitted from the linking system 102 to the second device 105. For example, the second content can comprise the enhanced features associated with the first content. As an example, the enhanced features can comprise a knowledge base of specific characters or performers in the first content, advertisements, promotions, purchasing opportunities, interest points, highlighting points, polling points or coupons related to a specific scene, character or time instance in the first content. As another example, the enhanced features can comprise information on content length, content title, content provider, content type (e.g. pay-per-view content, video on demand content), content format (e.g., digital, analog), content identifier (e.g., content id), content release date, content update frequency, content category (e.g. romance, comedy, etc.), content rating (e.g. PG, R, PG-13), the price for ordering the first content, content viewing history, and the like In an exemplary aspect, the methods and systems can be implemented on a computer 601 as illustrated in FIG. 6 and described below. By way of example, the computer 601 as illustrated in FIG. 6 can be the first device 104 and/or the second device 105 of FIG. 1. As another example, the remote computing devices 614a,b,c in FIG. 6 can be the content provider 101, linking system 102, network device 103, first device 104, second device 105, or billing system 106. Similarly, the methods and systems disclosed can utilize one or more computers to perform one or more functions in one or more locations. FIG. 6 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 601. The components of the computer 601 can comprise, but are not limited to, one or more processors or processing units 603, a system memory 612, and a system bus 613 that couples various system components including the processor 603 to the system memory 612. In the case of multiple processors 603, the system can utilize parallel computing.

The system bus 613 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like. The bus 613, and all buses specified in this description can also be implemented over a wired or wireless network connection and each of the subsystems, including the processor 603, a mass storage device 604, an operating system 605, content processing software 606, content data 607, a network adapter 608, system memory 612, an Input/Output Interface 610, a display adapter 609, a display device 611, and a human machine interface 602, can be contained within one or more remote computing devices 614a,b,c at physically separate locations, connected through buses of this form, in effect implementing a fully distributed system.

The computer 601 typically comprises a variety of computer readable media. Exemplary readable media can be any available media that is accessible by the computer 601 and comprises, for example and not meant to be limiting, both volatile and non-volatile media, removable and non-removable media. The system memory 612 comprises computer readable media in the form of volatile memory, such as random access memory (RAM), and/or non-volatile memory, such as read only memory (ROM). The system memory 612 typically contains data, such as content data 607 and/or program modules, such as operating system 605 and content processing software 606 that are immediately accessible to and/or are presently operated on by the processor 603.

In another aspect, the computer 601 can also comprise other removable/non-removable, volatile/non-volatile computer storage media. By way of example, FIG. 6 illustrates a mass storage device 604 that can provide non-volatile storage of computer code, computer readable instructions, data structures, program modules, and other data for the computer 601. For example and not meant to be limiting, a mass storage device 604 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 604, including by way of example, an operating system 605 and content processing software 606. Each of the operating system 605 and content processing software 606 (or some combination thereof) can comprise elements of the programming and the content processing software 606. Content data 607 can also be stored on the mass storage device 604. Content data 607 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 601 via an input device (not shown). Examples of such input devices comprise, but are not limited to, a keyboard, pointing device (e.g., a "mouse"), a microphone, a joystick, a scanner, tactile input devices, such as gloves, and other body coverings, and the like These and other input devices can be connected to the processor 603 via a human machine interface 602 that is coupled to the system bus 613, but can be connected by other interface and bus structures, such as a parallel port, game port, an IEEE 1394 Port (also known as a Firewire port), a serial port, or a universal serial bus (USB).

In yet another aspect, a display device 611 can also be connected to the system bus 613 via an interface, such as a display adapter 609. It is contemplated that the computer 601 can have more than one display adapter 609 and the computer 601 can have more than one display device 611. For example, a display device can be a monitor, an LCD (Liquid Crystal Display), or a projector. In addition to the display device 611, other output peripheral devices can comprise components, such as speakers (not shown) and a printer (not shown) that can be connected to the computer 601 via Input/Output Interface 610. Any step and/or result of the methods can be output in any form to an output device. Such output can be any form of visual representation, including, but not limited to, textual, graphical, animation, audio, tactile, and the like. The display 611 and computer 601 can be part of one device, or separate devices.

The computer 601 can operate in a networked environment using logical connections to one or more remote computing devices 614*a,b,c*. By way of example, a remote computing device can be a personal computer, portable computer, smartphone, a server, a router, a network computer, a peer device or other common network node, and so on. Logical connections between the computer 601 and a remote computing device 614*a,b,c* can be made via a network 615, such as a local area network (LAN) and/or a general wide area network (WAN). Such network connections can be through a network adapter 608. A network adapter 608 can be implemented in both wired and wireless environments. Such networking environments are conventional and commonplace in dwellings, offices, enterprise-wide computer networks, intranets, and the Internet.

For purposes of illustration, application programs and other executable program components, such as the operating system 605 are illustrated herein as discrete blocks, although it is recognized that such programs and components reside at various times in different storage components of the computing device 601, and are executed by the data processor(s) of the computer. An implementation of content processing software 606 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information, such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ artificial intelligence (AI) techniques, such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
receiving, by a server from a first user device via a non-packetized network, a first signal, wherein the first signal comprises a first device identifier associated with the first user device and indicates a request for second content associated with first content;
receiving, by the server, from a second user device via a packetized network, a second signal, wherein the second signal comprises a second device identifier associated with the second user device;
determining, based on a comparison of the first device identifier and the second device identifier, an association between the first signal and the second signal; and
causing, based on the association, the second content to be sent to the second user device via the packetized network.

2. The method of claim 1, wherein determining, based on the comparison of the first device identifier and the second device identifier, the association between the first signal and the second signal comprises determining, based on the first device identifier matching the second device identifier, the association between the first signal and the second signal.

3. The method of claim 1, wherein the first signal further comprises an indicator of a portion of the first content.

4. The method of claim 1, wherein causing the second content to be sent to the second user device comprises:
sending, by the server and to a content provider computer, a second request for the second content;
receiving, by the server and based on the second request for the second content, the second content; and
sending the second content to the second user device.

5. The method of claim 1, further comprising determining, based on the first device identifier, that a user associated with the first user device is permitted to access the second content.

6. The method of claim 1, wherein the first signal comprises a trigger signal and wherein the trigger signal further comprises a linkage message and one or more respective indices associated with one or more trigger elements associated with the first content.

7. The method of claim 1, wherein each of the first device identifier and the second device identifier comprises at least one of a user identifier, a device identifier, an internet protocol address, a network address, or a media access control (MAC) address.

8. One or more non-transitory computer-readable media storing processor-executable instructions that, when executed by at least one processor, cause the at least one processor to:
receive, from a first user device via a non-packetized network, a first signal, wherein the first signal comprises a first device identifier associated with the first user device and indicates a request for second content associated with first content;
receive, from a second user device via a packetized network, a second signal, wherein the second signal comprises a second device identifier associated with the second user device;
determine, based on a comparison of the first device identifier and the second device identifier, an association between the first signal and the second signal; and
cause, based on the association, the second content to be sent to the second user device via the packetized network.

9. The one or more non-transitory computer-readable media of claim 8, wherein the processor-executable instructions that, when executed by the at least one processor, cause the at least one processor to determine, based on the comparison of the first device identifier and the second device identifier, the association between the first signal and the second signal, cause the at least one processor to determine, based on the first device identifier matching the second device identifier, the association between the first signal and the second signal.

10. The one or more non-transitory computer-readable media of claim 8, wherein the first signal further comprises an indicator of a portion of the first content.

11. The one or more non-transitory computer-readable media of claim 8, wherein the processor-executable instructions that, when executed by the at least one processor, cause the at least one processor to cause the second content to be sent to the second user device, cause the at least one processor to:
send, to a content provider computer, a second request for the second content;
receive, based on the second request for the second content, the second content; and
send, to the second user device, the second content.

12. The one or more non-transitory computer-readable media of claim 8, wherein the processor-executable instructions, when executed by the at least one processor, further cause the at least one processor to determine, based on the first device identifier, that a user associated with the first user device is permitted to access the second content.

13. The one or more non-transitory computer-readable media of claim 8, wherein the first signal comprises a trigger signal and wherein the trigger signal further comprises a linkage message and one or more respective indices associated with one or more trigger elements associated with the first content.

14. The one or more non-transitory computer-readable media of claim 8, wherein each of the first device identifier and the second device identifier comprises at least one of a user identifier, a device identifier, an internet protocol address, a network address, or a media access control (MAC) address.

15. A system comprising:
a computing device configured to:
receive, from a first user device via a non-packetized network, a first signal, wherein the first signal comprises a first device identifier associated with the first user device and indicates a request for second content associated with first content;
receive, from a second user device via a packetized network, a second signal, wherein the second signal comprises a second device identifier associated with the second user device;
determine, based on a comparison of the first device identifier and the second device identifier, an association between the first signal and the second signal; and
cause, based on the association, the second content to be sent to the second user device via the packetized network;
the first user device configured to:
send the first signal; and
the second user device configured to:
send the second signal; and
receiving the second content.

16. The system of claim 15, wherein to determine, based on the comparison of the first device identifier and the second device identifier, the association between the first signal and the second signal, the computing device is configured to determine, based on the first device identifier matching the second device identifier, the association between the first signal and the second signal.

17. The system of claim 15, wherein the first signal further comprises an indicator of a portion of the first content.

18. The system of claim 15, wherein to cause the second content to be sent to the second user device, the computing device is configured to:
   send, to a content provider computer, a second request for the second content;
   receive, from the content provider computer and based on the second request for the second content, the second content; and
   send, to the second user device, the second content.

19. The system of claim 15, wherein the computing device is further configured to determine, based on the first device identifier, that a user associated with the first user device is permitted to access the second content.

20. The system of claim 15, wherein the first signal comprises a trigger signal and wherein the trigger signal further comprises a linkage message and one or more respective indices associated with one or more trigger elements associated with the first content.

21. The system of claim 15, wherein each of the first device identifier and the second device identifier comprises at least one of a user identifier, a device identifier, an internet protocol address, a network address, or a media access control (MAC) address.

* * * * *